United States Patent
Jones et al.

(10) Patent No.: US 6,721,750 B1
(45) Date of Patent: Apr. 13, 2004

(54) SYSTEM AND METHOD FOR BROADBAND CAPACITY TRACKING

(75) Inventors: Marvin Thomas Jones, Atlanta, GA (US); Lynn Bainbridge Horton, Cumming, GA (US); Jason Lamar Sutton, Alpharetta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 305 days.

(21) Appl. No.: 09/898,599

(22) Filed: Jul. 3, 2001

(51) Int. Cl.[7] .............................. G06F 17/30
(52) U.S. Cl. ...................... 707/100; 707/101
(58) Field of Search .................. 707/1, 10, 100; 709/223, 224, 220; 370/485

(56) References Cited

U.S. PATENT DOCUMENTS

| | | |
|---|---|---|
| 5,680,325 A | 10/1997 | Rohner |
| 5,974,127 A | 10/1999 | Wernli et al. |
| 6,209,033 B1 * | 3/2001 | Datta et al. .................. 709/224 |

FOREIGN PATENT DOCUMENTS

WO  WO 01/74043 A1  10/2001

OTHER PUBLICATIONS

PCT US01/24761 International Search Report, mailed Jul. 31, 2002.
"Fixed Wireless: A Method for Broadband Internet Access Part 2: Business Basics" www.isp-planet.com/fixed_wireless/business/fw_101_part2_p2.html (Oct. 30, 2001) pp. 1–3.
Rakesh Khetarpal and S. Krishna Dronamraju, "Smart—A Solution for Managing the Capacity, Growth and Performance of Wireless Networks," Bell Labs Technical Journal, (Summer 1997) pp. 1–12.

* cited by examiner

Primary Examiner—Sanjiv Shah
(74) Attorney, Agent, or Firm—Merchant & Gould (57) ABSTRACT

The present invention is directed to a system and method for employing telecommunications capacity information. In an embodiment of the present invention as a computer system, a batch server retrieves data from various digital subscriber line (DSL) related data sources and stores that data in a database. The data sources contain data related to the supply and demand for DSL services. The data source includes hierarchical attributes, such as an indicator of the geography from which specific data originated. Another embodiment also includes an interdisciplinary attribute, such as a department name. An embodiment of the present invention also includes a web server. In response to a request, the web server extracts the data from the database, and if necessary, calculates information concerning future supply and demand for DSL services. The web server generates an HTML report containing this data and transmits the report to the originator of the request. An embodiment of the present invention provides an effective and efficient system and method for employing telecommunications capacity information.

34 Claims, 8 Drawing Sheets

SYSTEM AND METHOD FOR BROADBAND CAPACITY TRACKING

NOTICE OF COPYRIGHT PROTECTION

A portion of the disclosure of this patent document and its Figures contain material, which is subject to copyright protection. The copyright owner has no objection to the facsimile reproduction by anyone of the patent document or the patent disclosure, but otherwise reserves all copyrights whatsoever.

FIELD OF THE INVENTION

The present invention relates generally to the field of telecommunications system capacity planning. The present invention more particularly relates to providing broadband capacity tracking and planning information to promote the effective and efficient allocation of capital and resources in the provision a broadband service.

BACKGROUND

Efficient and effective capacity planning involves matching supply and demand in both time and place, ensuring that adequate capacity is available to meet demand while delaying the expenditure of resources until the last possible moment. Delaying expenditures allows an organization to take advantage of the time value of money as well as taking advantage of the availability of resources, monetary or otherwise, for other needs.

Planning for required future capacity requires analysis of both historical trends and future demand projections. Conventionally, service providers measure current demand over specified periods of time, not only to help gauge future resource requirements, but also to accomplish basic tasks such as billing. For example, a utility company measures the quantity of a service, such as electricity or water that each customer consumes in order to bill the customer at the end of a billing cycle. Additionally, this data is a valuable tool for determining the utilization rate of current resources as well as projecting what resources will be necessary in the future. Projecting the necessary resources for basic services, such as basic residential phone service, is a relatively straightforward process. Most if not all of the customers who can take advantage of the service will do so. Projecting the demand for advanced services is a much more difficult exercise. Only a percentage of the subscribers to a basic service will choose to spend an additional amount for access to an advanced service. The percentage varies based on a variety of factors, including the socio-economic makeup of a geographic area as well as the types advertising and promotions directed to consumers in that geographic area.

Broadband communications service is one of these advanced services. The demand for broadband services, such as digital subscriber line (DSL) service, has risen dramatically in the recent past. According to DSL Prime News the number of DSL subscribers in the United States will double during 2001, reaching over 5.5 million subscribers. In the midst of this explosive growth, telecommunications service providers must make decisions regarding the best time and place in which to invest capital and resources in making DSL service available to ensure they can provide service to new subscribers, and perhaps more importantly, satisfy existing subscribers by providing a robust and reliable service.

Currently, no system exists to adequately track existing DSL subscriber demand and capacity or to project demand in the future. The lack of adequate capacity tracking and planning results in inefficiency in the utilization of capital. Service provider management teams have no effective and efficient means to identify under-capacity and over-capacity situations in a timely fashion, and therefore, management's critical need for information is unfulfilled.

Conventional capacity planning systems for the provision of broadband services exist. However, these existing systems are reactionary in nature. A current exemplary system collects subscriber and demand data in order to calculate a utilization percentage. When the utilization percentage reaches a preset threshold, the system triggers an alarm or warning message. A service provider may not be able to deploy additional resources quickly enough to satisfy demands on the broadband service. Also, current systems lack the level of detail necessary to effectively and efficiently deploy capital and resources. Forecasting at the organization level has proven much simpler than forecasting at the community or subdivision level, and therefore, planning is done at a macro level. This approach to capacity planning for broadband services requires highly error-prone educated guesswork to determine what equipment to install at the actual physical equipment locations, resulting in additional inefficiencies in capital utilization.

The challenge service providers facing is how to accurately predict exactly when and where to provide additional equipment to ensure continuity of service with minimal interrupts and to ensure minimal lead-time for new installations. A need exists for an effective and efficient broadband capacity management system.

SUMMARY OF THE INVENTION

Embodiments of the present invention are directed to a system and method for employing telecommunications capacity information. An embodiment of the present invention includes a network connected to a data source connected, which contains data relating to the provision of digital subscriber line service. The data source may be an existing database or text file from a legacy system or may be a network element such as a digital subscriber line access multiplexer (DSLAM).

The data source includes hierarchical demand and capacity data. The hierarchical attribute defines relationships between various data in the data source. For example, in one embodiment of the present invention, a hierarchical attribute describes geographic information about a data item, relating the data to a residential subdivision, a state or a region.

In another embodiment of the present invention, the data source includes an interdisciplinary attribute. The interdisciplinary attribute describes to which vertical division within an organization the data in the data source is associated. For example, in one embodiment of the present invention, the department from which data originated is an interdisciplinary attribute of the data.

An embodiment of the present invention also includes a database for storing demand and capacity data and includes a processor for (1) retrieving the data from the data source, (2) storing the data in the database, (3) subsequently extracting the data and (4) generating a report. The processor in an embodiment of the present invention includes multiple computers, including a batch server for retrieving the data and storing it in a database and a web server for receiving requests for data and, in response, generating and transmitting hypertext markup language (HTML) pages in response. The web server performs various tasks in generating the HTML pages. For example, the web server may utilize components to calculate projected data points using linear regression.

Various other embodiments of the present invention create reports in formats other than HTML, including a portable document format file, a spreadsheet and a multidimensional database accessed through an on-line analytical processing interface. An embodiment of the present invention may also provide the capability of filtering the data presented in a report. For example, a web server generates transmits an HTML form containing a series of selection controls, such as drop-down combo boxes, and navigation controls, such as hyperlinks or buttons. In response to activation of a navigation control, an embodiment of the present invention submits the form containing the value of the selection controls to the web server. In response, the web server generates and presents an HTML report.

Another embodiment of the present invention includes an HTML page, containing a series of navigation controls from which a user may select. The navigation controls include an asymmetrical digital subscriber line (ADSL) navigation control and several additional navigation controls that activate common application elements such as a frequently asked questions (FAQ) page and a feedback form. Selection of the ADSL navigation control triggers display an ADSL summary display, a trending navigation control, and a variety of reporting options, including an excess capacity report. The ADSL summary page includes general information regarding the provision of ADSL as well as information regarding additional options. Selection of the trending navigation control triggers the display of a trending report parameter form, which in turn includes a navigation control that triggers display of a trending report. An embodiment of the present invention also provides the ability to perform a number of administration functions, including modifying existing database entries and creating new database entries.

Embodiments of the present invention provide numerous advantages over existing solutions, enhancing an organization's ability to deploy capital at the right time in the right place. An embodiment of the present invention merges service availability and capital management into a cohesive view, allowing for just-in-time deployment of capital resources. Just-in-time deployment of capital provides a competitive advantage because it allows an organization to delay outlays of monetary and other resources until necessary. For example, in an embodiment of the present invention, the excess capacity report is an extremely valuable report for the efficient management of capital. The report tests capacity plans and identifies opportunities to delay installation or reduce the configuration size and cost of new equipment.

Because embodiments of the present invention present accurate information regarding subscriber activity in a subdivision, region or a state, embodiments of he present invention have the additional advantage of assisting an organization in making effective decisions to deploy capital at the right place. As a result of the ability to deploy capital in the right place and time, providers can increase revenues, plan and control expenses, reduce lead times and increase continuity of the service, thereby increasing customer loyalty.

An embodiment of the present invention also allows a service provider to make marketing and advertising decisions more effectively. For example, if excess capacity exists in a particular area, the service provider may launch an advertising campaign in order to more fully utilize the existing capacity. An embodiment of the present invention also allows for accurate measurement of the effectiveness of advertising and promotional campaigns. For example, if a promotion is put into effect, such as lowering the price of DSL service, the effect of that promotion can be accurately measured in an embodiment of the present invention as an increase in demand in the targeted geographical area. The service provider is prepared to monitor demand in the area where demand is expected to increase and can add equipment if necessary.

An embodiment of the present invention provides a further advantage by utilizing HTML reports, providing a nearly universally accessible application within any security constraints present in a particular environment. Therefore, multiple departments and levels within an organization can utilize the capacity tracking information to improve the planning for and the actual provision of services.

Further details and advantages of the present invention are set forth below.

BRIEF DESCRIPTION OF THE FIGURES

These and other features, aspects, and advantages of the present invention are better understood when the following Detailed Description is read with reference to the accompanying drawings, wherein:

FIG. 8 is a screen shot of an HTML Excess Capacity report in an embodiment of the present invention.

DETAILED DESCRIPTION

Embodiments of the present invention provide systems and methods for employing telecommunications capacity information. One system according to the present invention includes a variety of elements interconnected through a network, which facilitate the retrieval, storage and reporting of information relating to the provision of digital subscriber line (DSL) service. Various embodiments of the present invention may utilize the Internet, an intranet or a telecommunications network.

The processor in an embodiment of the present invention may include multiple computers. In one embodiment of the present invention, the processor includes a server for retrieving and storing the data points and to generate the report. The embodiment also includes a client for presenting the report. In another embodiment of the invention, the server consists of two separate servers: (1) a batch server for periodically retrieving the data points and storing them in the database, and (2) a web server for generating the graphical user interface.

Figure 1:
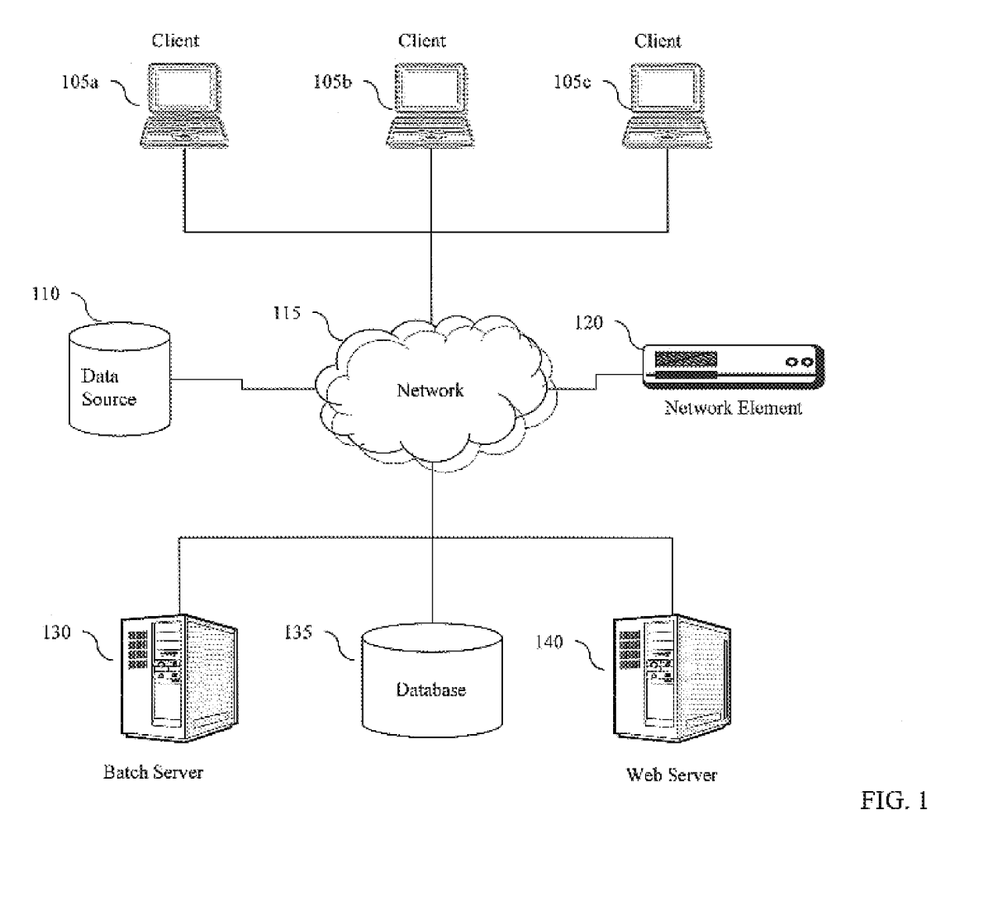
FIG. 1 is a diagram of an exemplary embodiment and an exemplary environment for operation of embodiments of the present invention.

FIG. 1 illustrates an embodiment of the present invention including multiple clients and servers connected to one another via a network. Referring to FIG. 1, an embodiment of the present invention includes a batch server 130. A batch server comprises a computer that executes programs that do not require user interaction while they are executing. The batch server is connected to a network 115 to which various other components of the system are also attached. The batch server may communicate with both an existing data source 110 as well as a network element 120 in order to extract capacity and demand data. One of the first steps in implementation of an embodiment of this application is the identification of data sources relevant to broadband capacity management. A data source relevant to broadband capacity information contains data relating to the usage of a broadband service, the availability of hardware resources, which serve the needs of broadband users, projected demand for broadband services, and marketing and advertising campaigns aimed towards increasing demand for broadband services. A data source includes multiple data points. A data point is a discrete piece of data, which can be extracted from the data source and stored in a database.

The data source 110 in an embodiment of the present invention includes a hierarchical attribute. The hierarchical attribute defines relationships between various data in the data source. For example, in one embodiment of the present invention, a hierarchical attribute describes geographic information about a data item, relating the data to a residential subdivision, a state or a region. In other embodiments of the present invention, the hierarchical relationship might refer to a hierarchy in an organization, such as the management hierarchy.

In another embodiment of the present invention, the data source may, in addition to including hierarchical attributes, include an interdisciplinary attribute. The inclusion of an interdisciplinary attribute permits the identification of the division or department within an organization with which specific data is related. An interdisciplinary attribute may indicate whether a department services residential or business customers or may identify a group as dedicated to marketing or logistics. Examples of values of an interdisciplinary attribute in an embodiment of the present invention include a business systems group, a capacity manager, a group specifically formed to market and support broadband access and a general marketing department. In an embodiment including both a hierarchical attribute and an interdisciplinary attribute, both the horizontal and vertical aspects of capacity planning are available to the user.

Data sources in an embodiment of the present invention include a subscriber account summary, an equipment detail, a marketing forecast and a deployment plan. The account summary indicates the actual demand each subscriber is placing on the system, and when aggregated, indicates the total demand for broadband services. The equipment detail provides information regarding a specific piece of equipment, such as the potential capacity the device supports. The marketing forecast provides information relating to future demand for broadband service, and the deployment plan includes information regarding future capacity.

Referring again to FIG. 1, the data source 110 includes a database, such as Oracle, Sybase or Microsoft SQL Server or other open database connectivity (ODBC) compliant data source. In one embodiment of the present invention, the batch server retrieves actuals data from an Oracle database, equipment installation dates from a Microsoft SQL Server database, marketing forecasts from a Sybase database, and receives data via FTP from a plurality of legacy systems. The data source also includes other types of data store, containing data relevant to broadband capacity management (BCM), such as a text file generated by a legacy application on a mainframe computer. In an embodiment of the present invention, the batch server retrieves a text file from a mainframe computer using file transfer protocol (FTP) software.

Another embodiment of the present invention retrieves data directly from a network element 120. A network element may include a router, a digital subscriber line access multiplexer (DSLAM) or any other piece of equipment relevant to BCM. In the embodiment shown in FIG. 1, the network element is a DSLAM. The batch server 130 includes scheduling software so that the retrievals execute on a periodic basis. The retrieval period is dependant on the type of data existing in or on a particular data source. In one embodiment of the present invention, the data is extracted from all data sources on a nightly basis. The batch server periodically retrieves data from the data source and network element and stores that data in a database 135. Multiple types of databases may be utilized to store data. In one embodiment of the present invention, the database is a Microsoft® SQL Server 7 database.

An embodiment of the present invention also includes a web server 140. A web server receives request over a standard protocol, such as hypertext transfer protocol (HTTP), and in response, performs a process. The process may be simply to locate an existing HTML page and transmit the HTML page to the origination point of the request. The process may be more complex. Various hardware and software configurations are available for hosting web applications. Many of these configurations provide for the execution of a program on the web server in response to receiving a request. The program can retrieve data and perform complex processing. In an embodiment of the present invention, the web server is an Intel-based server running the Microsoft® Windows NT 4.0 operating system and Microsoft® Internet Information Server. When a client 105a–c requests a form or report from a web server, the request triggers execution of a Microsoft® Active Server Pages program (ASP). The ASP uses a combination of VBScript, common object model (COM) dynamically linked libraries (dll) and other applications, such as Microsoft® Excel to create hypertext markup language (HTML) pages, including both HTML tags and JavaScript. The COM objects may be accessed directly or may be accessed via an object brokering service such as Microsoft Transaction Server. If the HTML page includes a chart, the page will include an object link to a Java applet for displaying a chart on a HTML page in a browser. Various other embodiments of the present invention create reports in formats other than HTML, including a portable document format file, a spreadsheet and a multidimensional database accessed through an on-line analytical processing (OLAP) interface. A multidimensional database is sometimes referred to as cube. A cube would be analogous to a three-dimensional database. Databases containing a greater number of dimensions have no physical metaphor, but organize data to mirrors an organization's use of the data. Typical dimensions include time, geographical areas, and departments within an organization. A multidimensional database also includes various measures, which are the types of numbers reported, and also includes the values of those measures. An OLAP interface allows a user to interactively filter and view various dimensions of the multidimensional database. Generally, OLAP is used to provide fast response when working with a very large, complex database.

The ASP in an embodiment of the present invention may perform additional tasks as well. For example, in an embodiment of the present invention, the ASP may determine the value of a projected data point, data regarding capacity or demand in the future. In order to determine the value of the projected data point, in one embodiment of the present invention, the ASP executes a program, such as a COM object, which extrapolates the value of the projected data point using linear regression. Linear regression involves determining the future data points by applying a mathematical formula to the data points, which occurred in the past. The object of linear regression is to determine the most likely value of future data given past trends. Various methods of performing linear regression are available. In one embodiment of the present invention, the processor utilizes Microsoft® Excel to perform the calculation.

Figure 2:
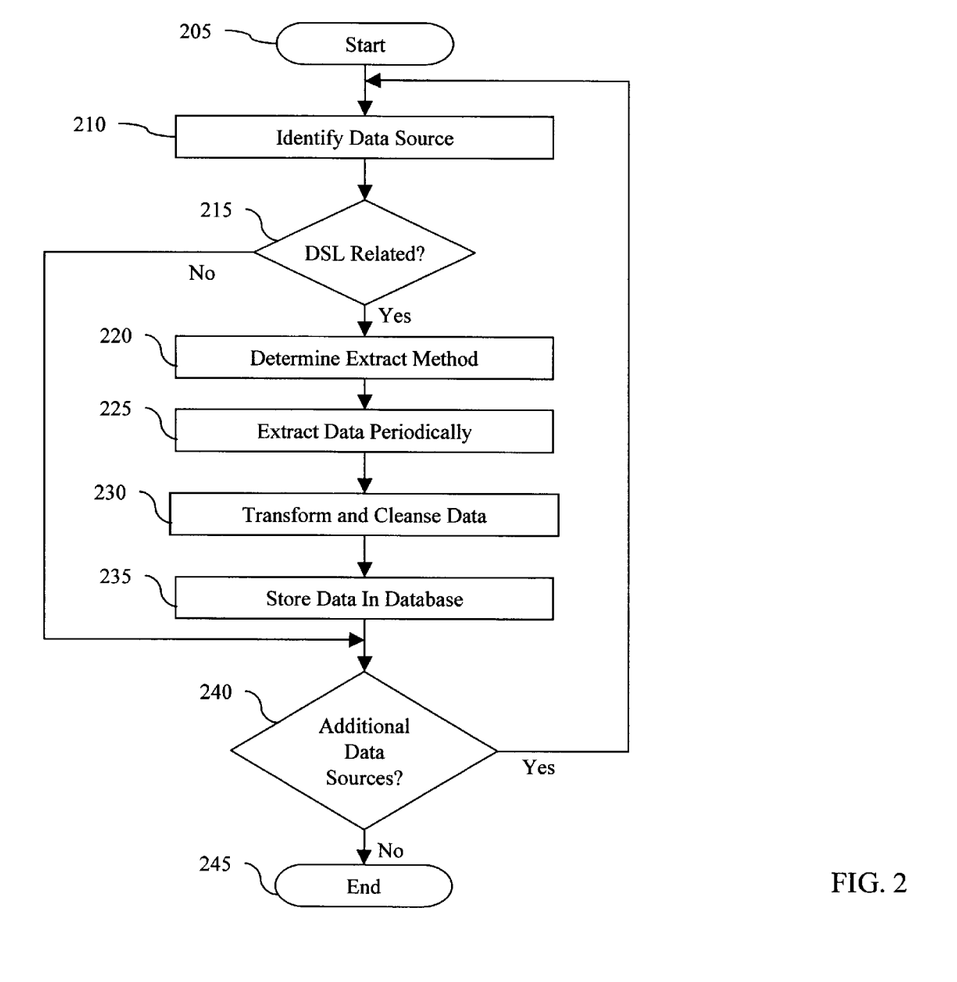
FIG. 2 is a flowchart illustrating an exemplary method for identifying a data source, extracting a data point and storing the data point in a database in an embodiment of the present invention.

FIG. 2 is a flowchart illustrating an exemplary method for identifying a data source, extracting a data point and storing the data point in a database in an embodiment of the present invention. Initially, in an embodiment of the present invention, an administrator or developer identifies a data source 210. The administrator then determines whether or not the data source is related to the provision of DSL service 215. If not, the administrator of the system determines if additional data sources exist 240. If the data source is DSL-related, the administrator identifies the extract method appropriate for the particular identified data source 220 configures the batch server to automatically extract the data periodically 225. The batch server, via the extract program, transforms and cleanses 230 the data and stores the data in a database 235. Transformation and cleansing are database terms, which refer to the process of standardizing the keys in the data and removing or omitting data based on pre-defined triggers, such as when an obvious error is present in the data. In an embodiment of the present invention, the administrator continues searching for and identifying additional data sources 240 until identifying all DSL-related data sources, where practicable.

Figure 3:
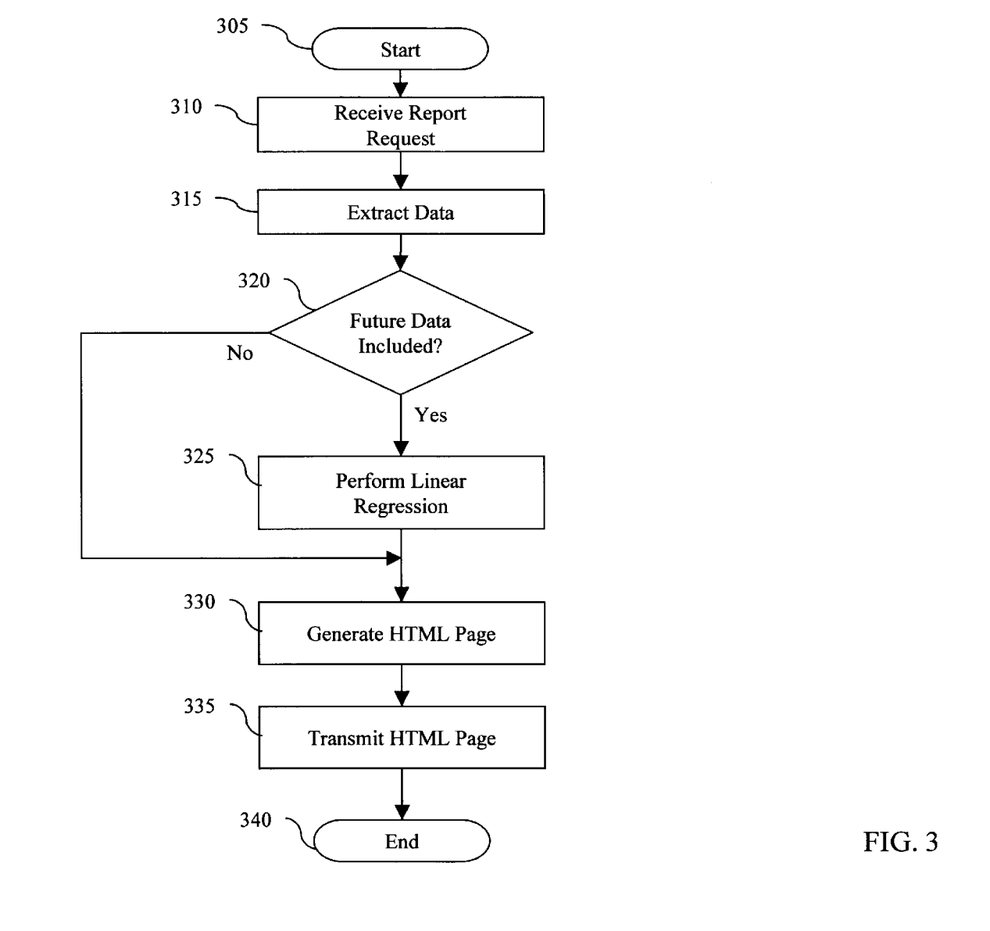
FIG. 3 is a flowchart illustrating an exemplary method for generating and transmitting an HTML report in response to a request in an embodiment of the present invention.

An embodiment of the current invention may provide reports in response to a request or may automatically create reports and store them on one of the servers. FIG. 3 illustrates a method for generating and transmitting an HTML report in response to a request in an embodiment of the present invention. First, the web server receives a request for a report 310. The web server then executes an ASP to extract the relevant data needed to construct a report from a database 315. An algorithm within the ASP determines whether the request includes a request for projected future data 320. Projected future data consists of data points corresponding to future dates, which are calculated by using past trends or other forecasting methods. If projected future data is requested, the ASP instantiates a component, which performs linear regression on the historical data to generate the projected values of future data 325. The ASP program generates the report as an HTML page 330 and the web server transmits the HTML page based on the parameters in the request 335.

An embodiment of the present invention may include within the report a series of options from which a user may select. Some or all of these options may be navigation controls. A navigation control may be a hyperlink or button or any other control that signals the processor to take an action, such as retrieving another HTML page. In an embodiment of the present invention, the report includes the following options: an asymmetrical digital subscriber line (ADSL) navigation control, a logon navigation control, a manage logons navigation control, a latest news navigation control, a frequently asked question (FAQ) navigation control and a feedback navigation control. Selection of the ADSL navigation control triggers display of an ADSL home page, including an ADSL service summary as well as additional navigation controls specific to ADSL. These navigation controls include a trending navigation control, a reports navigation control, an administration navigation control, a circuit capacity manager (CCM) aids navigation control and a loop capacity manager (LCM) aids navigation control.

Figure 4:
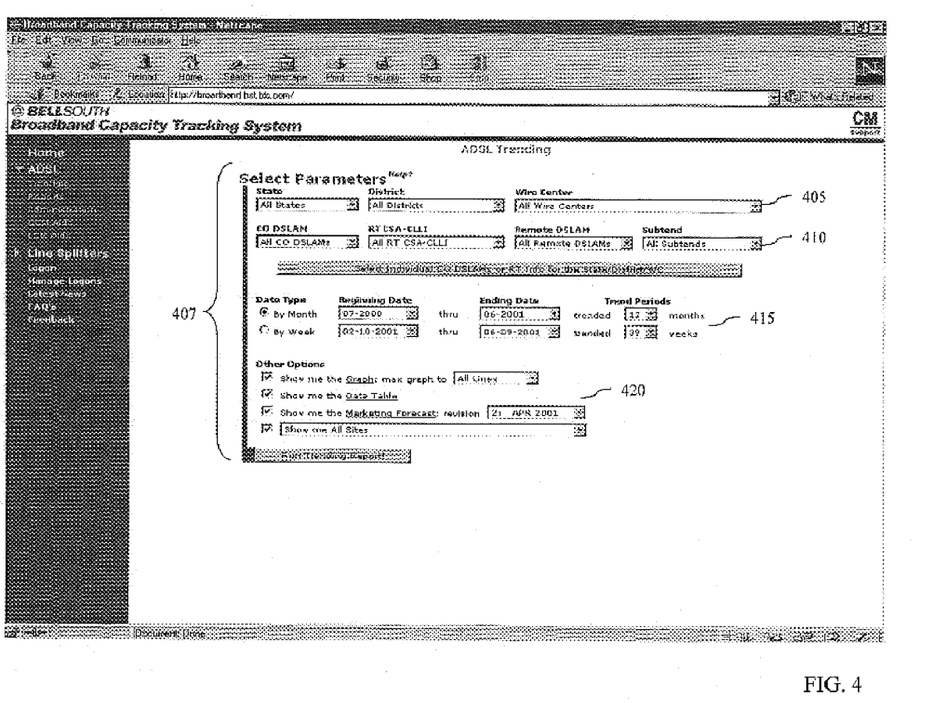
FIG. 4 is a screen shot of an HTML form for entry of parameters to create an ADSL trending report in an embodiment of the present invention.

In an embodiment of the present invention, selection of the trending navigation control triggers display of a trending report parameter form. Referring to FIG. 4, the parameter form includes various selection controls for customization of the trending report. The form 407 provides for the specification of various parameters. The uppermost section of the form provides for the specification of the geographic location, including the state, district and wire center 405. The form also provides for the specification of the particular network elements of interest 410, including a CO DSLAM, a remote terminal carrier serving area—common language location identifier (RT CSA-CLLI), a remote DSLAM and a subtend. In this context, a "subtend" is a network element, interfacing the broadband network through a CO DSLAM as opposed to a remote DSLAM, which interfaces directly to the Asynchronous Transfer Mode (ATM) broadband switch in parallel with the CO DSLAM. Remote DSLAMs and subtends physically reside at the remote terminal (RT), whereas CO DSLAMs physically reside within the central office. An RT is a property that houses equipment for areas located too far from a central office to be supported directly by the central office.

Again, referring to FIG. 4, the form also provides selection controls for specification of the date 415 and other parameters 420. Examples of other parameters include the ability to specify all lines on a chart or only specific lines. Additional controls provide the ability to specify all sites, or only sites that have or have not deployed equipment. Once parameter specification is complete, activation of the generate trend chart navigation control 425 causes the generation of the report, including a trend chard and a data grid.

Figure 5:
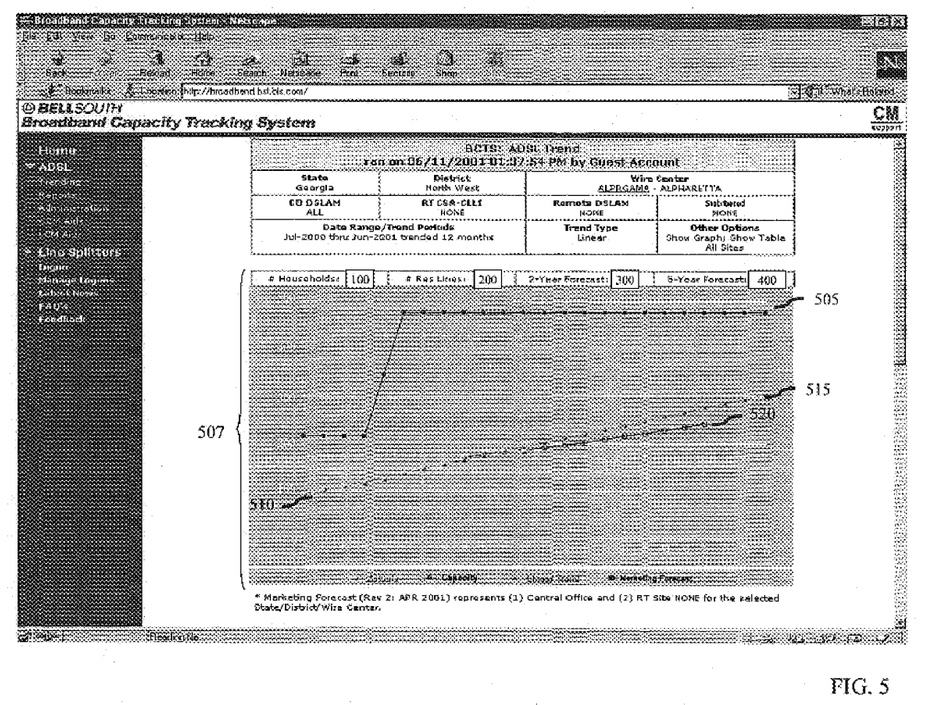
FIG. 5 is a screen shot of an HTML page, including the chart portion of an ADSL trending report in an embodiment of the present invention.
Figure 6:
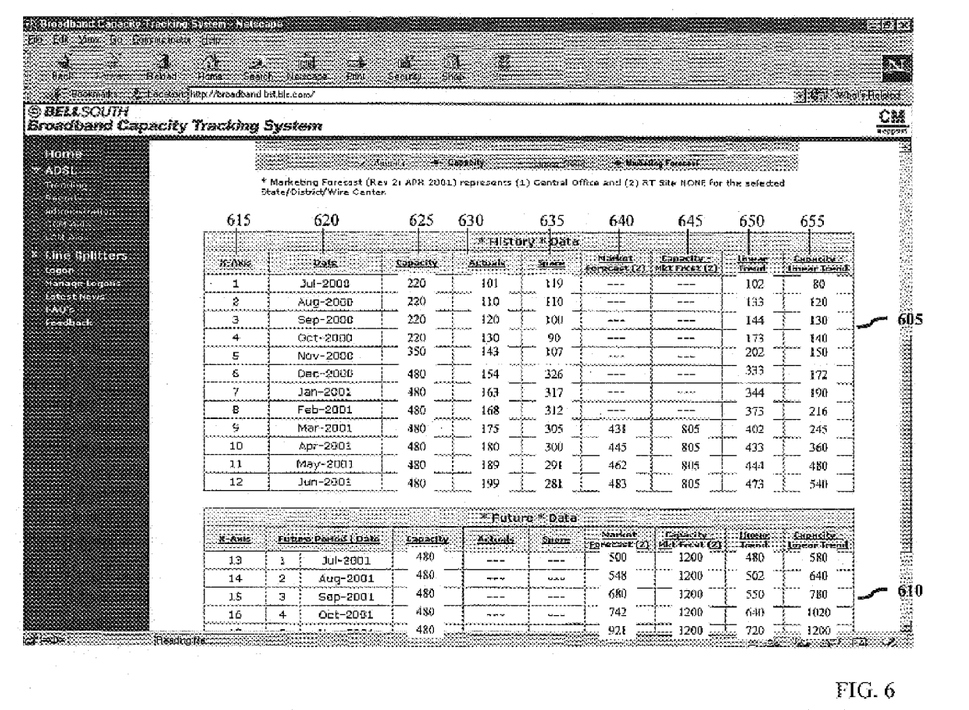
FIG. 6 is a screen shot of an HTML page, including the data grid portion of an ADSL trending report in an embodiment of the present invention.

FIGS. 5 and 6 are screen shots of the trend chart and data grid respectively. The trending report includes multiple sections: a trend chart, which is a graphical representation of current and projected capacity and demand, and a data grid corresponding to the chart. A data chart, in the form of some type of graph, is often the most advantageous method to convey data occurring over time. Referring to FIG. 5, in an embodiment of the present invention, the trend chart includes a series of lines. The first line depicts actual and projected capacity 505. The second line depicts actual demand 510. The third line depicts projected demand based on linear regression of actual demand 515. The fourth line depicts projected demand based on a marketing forecast 520.

FIG. 6 is a screen shot of the bottom portion of the ADSL trending report, including the data grid that supports the trend chart. The data grid includes both historical 605 and future data 610. The first column 615 is a reference number used to align dates and data points. The Date column 620 is either the actual or trended date for the data in a row of the grid. The Capacity column 625 is the capacity of the selected network elements. The Actuals column 630 provides the actual usage of the network element. The value in the Spare column 635 is equal to the value in the Capacity column less the value in the Actuals column. The Market Forecast column 640 contains the market forecast for usage of the network element, and the Capacity—Mkt Forecast column 645 contains the forecasted capacity for a network element. The Linear Trend column 650 includes the projected usage of the network element based on linear regression of actual usage. The Capacity—Linear Trend column 655 includes the projected capacity of the network element based on linear regression of the actual capacity. For example, the first row of the historical data grid 605 corresponds to July 2000. The actual capacity and demand, as shown on the data chart 507, above the first hash mark of the horizontal axis correspond to the first row in the data grid. For July 2000, the actual capacity is 220 and the actual number of subscribers is 101, leaving the available capacity of 119.

An embodiment of the present invention includes a variety of reporting options. Selection of a reports navigation control triggers display of a reports selection form, including a utilization report navigation control, an exhaust report navigation control, an excess capacity report navigation control, an RT send to loop qualification status (LQS) report navigation control, a network elements ad-hoc report navigation control, a data discrepancies report navigation control, a central office (CO) lines-on-copper report navigation control, and a CO hub shelves navigation control.

In an embodiment of the present invention, the utilization report illustrates the capacity, actual usage, pending capacity, spare capacity and utilization percentage of network elements. The exhaust report illustrates the wire centers or remote terminals that will exhaust capacity within a selected timeframe on current utilization percentages and linear regression of current capacity and actual usage. The RT Send to LQS report illustrates, in summary or detail form, alerts concerning a lack of spare ports at a remote terminal site. The data discrepancy report illustrates various data discrepancies between the reporting database and the various underlying data sources. The CO lines-on-copper report illustrates the number of users directly connect to a CO DSLAM within the past five weeks, with additional statistics displayed for the most current week. The CO hub shelves report illustrates the number of existing and pending hub shelves for a wire center or CO DSLAM.

Figure 7:
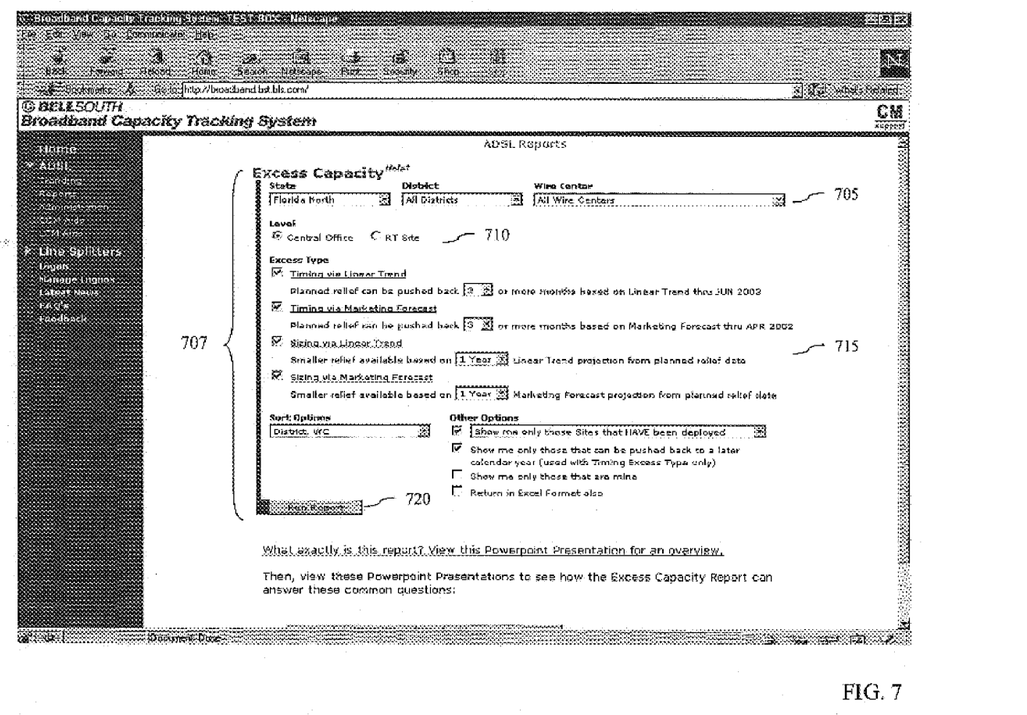
FIG. 7 is a screen shot of an HTML form for entry of parameters to create an Excess Capacity report in an embodiment of the present invention.

In an embodiment of the present invention, the excess capacity report is a critical report for the efficient management of capital. The report tests capacity plans and identifies opportunities to delay installation or reduce the configuration size and cost of new equipment. In order to create an excess capacity report in an embodiment of the present invention, a form is sent to the client and displayed on the client computer. The client inputs data and submits the form to the web server in the form of a request. The web server analyzes the request and generates a report. Referring to FIG. 7, the excess capacity report includes a form for specifying reporting options. The form includes selection controls for specifying the geographic location 705 as well as the level at which the report is displayed 710. The form also includes a series of selection controls for specifying the excess type categories that the report includes 715. The form includes a "Run Report" navigation control to trigger display of the report 720.

FIG. 8 is a screen shot of an Excess Capacity report in an embodiment of the present invention. The report includes a heading section 805 as well as a detail section 810. The heading section includes a summary of the various methods of analyzing excess capacity 815. The first several columns identify the location or the specific network device as well as the timing of future hardware installations, termed relief 820. The next pair of columns 825 compares the timing of relief to the projected usage based on linear regression. A value of "Yes" in the first of these two columns indicates that relief may be delayed. The date present in the second of these two columns indicates the day on which relief is projected to be necessary. The next pair of columns 830 indicates the same analysis, however these values indicate the analysis using market forecast as opposed to linear regression for determining the projected values. The next two pairs of columns 835, 840 indicate what size relief will be necessary at a fixed time in the future, 1 year from the relief effected date in the sample report. Once again, the analysis indicates the resulting values using both linear regression 835 and market forecast 840.

An embodiment of the present invention provides information, which helps a service provider make more effective decisions regarding not only purchasing and deploying equipment, but also regarding marketing and advertising services. If excess capacity exists in a specific area, the service provider may use targeted advertising in an attempt to utilize the excess capacity.

An embodiment of the present invention also includes a number of administrative functions, including a form on which to select parameters for searching existing entries in the database. Once an entry is found, an embodiment of the present invention provides a form, which allows modification of the attributes of the existing entry. An embodiment of the present invention also includes a form for adding CO digital subscriber line access multiplexers (DSLAM) to the database.

An embodiment of this system also includes various additional options to aid users of the application in accomplishing their responsibilities. Circuit capacity managers and loop capacity managers are responsible for managing the deployment and support of network elements within a telecommunications network. In an embodiment of the present invention, selection of a circuit capacity manager (CCM) aids navigation control triggers display of a CCM aids form. The CCM aids form includes a series of navigation controls, corresponding to CCM aids documents. An aid or job aid is either a concise statement of an organizational standard or a specific set of instructions about one of the tasks in a deployment process. The selection of a CCM aid document navigation control triggers display of the document itself. For instance selection of a CCM aid document navigation control may trigger display of a portable document format document or of a word processing document. In an embodiment of the present invention, selection of the loop capacity manager (LCM) aids navigation control triggers display of a LCM aids form. Just as with the CCM aids form, the LCM aids form includes navigation controls for display of LCM aid documents.

An embodiment of the present invention provides various other options as well. A logon option provides a user of an application with the ability to provide identifying information to the application. A manage logons option allows an administrator of a system to determine which users have access to the system and what that access consists of, including among other attributes, the user's security level. A latest news option is self-evident; it provides a list of articles, papers, etc. of relevance to the system, including a listing of the topics, article extracts and links to the articles themselves. A frequently asked question option provides a list of previously asked and answered questions about the system. Generally, a system administrator will determine which questions merit inclusion on an FAQ listing. A feedback option provides a user of the system with a mechanism to provide input to the administrators of the system regarding aspects of the system, including, among others, error experienced and general satisfaction or lack thereof with the user interface.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A method for employing telecommunications capacity information comprising:
    (a) providing a data source related to a provision of a digital subscriber line (DSL) service, comprising a hierarchical capacity data point and a hierarchical demand data point;
    (b) retrieving said hierarchical capacity data point from said data source;
    (c) storing said hierarchical capacity data point in a database;
    (d) retrieving said hierarchical demand data point from said data source;
    (e) storing said hierarchical demand data point in said database;
    (f) extracting said hierarchical capacity data point and said hierarchical demand data point from said database; and
    (g) generating a report comprising:
        said hierarchical capacity data point and said hierarchical demand data point; and
        a plurality of navigation controls for customizing the report.

2. The method of claim 1, wherein said data source further comprises an interdisciplinary attribute.

3. The method of claim 1, wherein said data source comprises at least one of:
    a subscriber account summary;
    a deployment plan;
    a marketing forecast; and
    an equipment detail.

4. The method of claim 1, further comprising projecting a future data point value.

5. The method of claim 4, wherein said projecting comprises performing linear regression.

6. The method of claim 1, wherein at least one of said plurality of navigation controls is an asymmetrical digital subscriber line (ADSL) navigation control.

7. The method of claim 6, wherein selection of said asymmetrical digital subscriber line (ADSL) navigation control triggers display of an ADSL HTML page comprising:
    an ADSL summary display; and
    an ADSL navigation control.

8. The method of claim 7, wherein said ADSL navigation control comprises at least one of:
    a trending navigation control; and
    a reports navigation control, wherein selection of said reports navigation control triggers display of a reports selection form comprising:
        a utilization report navigation control,
        an excess capacity report navigation control, and
        a network elements ad-hoc report navigation control.

9. The method of claim 8, wherein selection of said trending navigation control triggers display of a trending report comprising:
    a trend chart; and
    a data grid corresponding to said trend chart.

10. The method of claim 9, wherein said trend chart comprises:
    a first line depicting actual and projected capacity;
    a second line depicting actual demand;
    a third line depicting projected demand based on linear regression of said second line; and
    a fourth line depicting projected demand based on a marketing forecast.

11. A method for employing telecommunications capacity information comprising:
    (a) providing a data source related to a provision of a digital subscriber line (DSL) service, comprising a hierarchical interdisciplinary capacity data point and a hierarchical interdisciplinary demand data point;
    (b) retrieving said hierarchical interdisciplinary capacity data point from said data source;
    (c) storing said hierarchical interdisciplinary capacity data point in a database;
    (d) retrieving said hierarchical interdisciplinary demand data point from said data source;
    (e) storing said hierarchical interdisciplinary demand data point in said database;
    (f) extracting said hierarchical interdisciplinary capacity data point and said hierarchical interdisciplinary demand data point from said database; and
    (g) generating a report comprising:
        said hierarchical interdisciplinary capacity data point and said hierarchical interdisciplinary demand data point; and
        a plurality of navigation controls for customizing the report.

12. The method of claim 11, wherein said data source comprises digital subscriber line (DSL) service provision data source.

13. The method of claim 11, wherein said data source comprises at least one of:
    a subscriber account summary;
    a deployment plan;
    a marketing forecast; and
    an equipment detail.

14. The method of claim 11, further comprising projecting a future data point value.

15. The method of claim 14, wherein said projecting comprises performing linear regression.

16. The method of claim 11, wherein at least one of said plurality of navigation controls is an asymmetrical digital subscriber line (ADSL) navigation control.

17. The method of claim 16, wherein selection of said asymmetrical digital subscriber line (ADSL) navigation control triggers display of an ADSL HTML page comprising:
    an ADSL summary display; and
    an ADSL navigation control.

18. The method of claim 17, wherein said ADSL navigation control comprises at least one of:
   a trending navigation control; and
   a reports navigation control, wherein selection of said reports navigation control triggers display of a reports selection form comprising:
      a utilization report navigation control,
      an excess capacity report navigation control, and
      a network elements ad-hoc report navigation control.

19. The method of claim 18, wherein selection of said trending navigation control triggers display of a trending report comprising:
   a trend chart; and
   a data grid corresponding to said trend chart.

20. The method of claim 19, wherein said trend chart comprises:
   a first line depicting actual and projected capacity;
   a second line depicting actual demand;
   a third line depicting projected demand based on linear regression of said second line; and
   a fourth line depicting projected demand based on a marketing forecast.

21. A computer system for employing telecommunications capacity information comprising:
   (a) a network for facilitating communication;
   (b) a data source functionally connected to said network for storing data related to a provision of a digital subscriber line service, wherein said data source comprises a hierarchical capacity data point and a hierarchical demand data point;
   (c) a first database functionally connected to said network for storing:
      said hierarchical capacity data point, and
      said hierarchical demand data point; and
   (d) a processor functionally connected to said network for:
      retrieving said hierarchical capacity data point and storing said hierarchical capacity data point in said first database,
      retrieving said hierarchical demand data point and storing said hierarchical demand data point in said first database,
      extracting said hierarchical demand data point and said hierarchical capacity data point from said database;
      projecting a future data point value; and
      generating a report comprising said hierarchical demand data point, said hierarchical capacity data point, and said future data point value.

22. The system of claim 21, wherein said data source comprises an interdisciplinary attribute.

23. The system of claim 21, wherein said data source comprises at least one of:
   a subscriber account summary;
   a deployment plan;
   a marketing forecast; and
   an equipment detail.

24. The system of claim 21, wherein said processor comprises:
   a batch server for said retrieving of said capacity data point, said storing of said capacity data point, said retrieving of said demand data point and said storing of said capacity data point; and
   a web server for said extracting and said generating.

25. The system of claim 21, wherein said projecting comprises performing linear regression.

26. The system of claim 21, wherein said report comprises:
   an asymmetrical digital subscriber line (ADSL) navigation control.

27. The system of claim 26, wherein selection of said asymmetrical digital subscriber line (ADSL) navigation control triggers display of an ADSL HTML page comprising:
   an ADSL summary display; and
   an ADSL navigation control.

28. The system of claim 27, wherein said ADSL navigation control comprises at least one of:
   a trending navigation control; and
   a reports navigation control, wherein selection of said reports navigation control triggers display of a reports selection form comprising:
      a utilization report navigation control,
      an excess capacity report navigation control, and
      a network elements ad-hoc report navigation control.

29. The system of claim 28, wherein selection of said trending navigation control triggers display of a trending report comprising:
   a trend chart; and
   a data grid corresponding to said trend chart.

30. The system of claim 29, wherein said trend chart comprises:
   a first line depicting actual and projected capacity;
   a second line depicting actual demand;
   a third line depicting projected demand based on linear regression of said second line; and
   a fourth line depicting projected demand based on a marketing forecast.

31. A method for employing telecommunications capacity information comprising:
   (a) providing a data source related to a provision of a digital subscriber line (DSL) service, comprising a hierarchical capacity data point and a hierarchical demand data point;
   (b) retrieving said hierarchical capacity data point from said data source;
   (c) storing said hierarchical capacity data point in a database;
   (d) retrieving said hierarchical demand data point from said data source;
   (e) storing said hierarchical demand data point in said database;
   (f) extracting said hierarchical capacity data point and said hierarchical demand data point from said database;
   (g) generating a report comprising said hierarchical capacity data point and said hierarchical demand data point; and
   wherein said report comprises an asymmetrical digital subscriber line (ADSL) navigation control and wherein selection of said asymmetrical digital subscriber line (ADSL) navigation control triggers display of an ADSL HTML page comprising:
      an ADSL summary display; and
      an ADSL navigation control.

32. A method for employing telecommunications capacity information comprising:
   (a) providing a data source related to a provision of a digital subscriber line (DSL) service, comprising a hierarchical interdisciplinary capacity data point and a hierarchical interdisciplinary demand data point;

(b) retrieving said hierarchical interdisciplinary capacity data point from said data source;

(c) storing said hierarchical interdisciplinary capacity data point in a database;

(d) retrieving said hierarchical interdisciplinary demand data point from said data source;

(e) storing said hierarchical interdisciplinary demand data point in said database;

(f) extracting said hierarchical interdisciplinary capacity data point and said hierarchical interdisciplinary demand data point from said database;

(g) generating a report comprising said hierarchical interdisciplinary capacity data point and said hierarchical interdisciplinary demand data point; and wherein said report comprises an asymmetrical digital subscriber line (ADSL) navigation control and wherein selection of said asymmetrical digital subscriber line (ADSL) navigation control triggers display of an ADSL HTML page comprising:
an ADSL summary display; and
an ADSL navigation control.

33. A computer system for employing telecommunications capacity information comprising:

(a) a network for facilitating communication;

(b) a data source functionally connected to said network for storing data related to a provision of a digital subscriber line service, wherein said data source comprises a hierarchical capacity data point and a hierarchical demand data point;

(c) a first database functionally connected to said network for storing:
said hierarchical capacity data point, and
said hierarchical demand data point; and (d) a processor functionally connected to said network for:
retrieving said hierarchical capacity data point and storing said hierarchical capacity data point in said first database,
retrieving said hierarchical demand data point and storing said hierarchical demand data point in said first database,
extracting said hierarchical demand data point and said hierarchical capacity data point from said database;
generating a report comprising said hierarchical demand data point and said hierarchical capacity data point; and wherein said processor comprises:
a batch server for said retrieving of said capacity data point, said storing of said capacity data point, said retrieving of said demand data point and said storing of said capacity data point; and
a web server for said extracting and said generating.

34. A computer system for employing telecommunications capacity information comprising:

(a) a network for facilitating communication;

(b) a data source functionally connected to said network for storing data related to a provision of a digital subscriber line service, wherein said data source comprises a hierarchical capacity data point and a hierarchical demand data point;

(c) a first database functionally connected to said network for storing:
said hierarchical capacity data point, and
said hierarchical demand data point; and (d) a processor functionally connected to said network for:
retrieving said hierarchical capacity data point and storing said hierarchical capacity data point in said first database,
retrieving said hierarchical demand data point and storing said hierarchical demand data point in said first database,
extracting said hierarchical demand data point and said hierarchical capacity data point from said database;
generating a report comprising said hierarchical demand data point and said hierarchical capacity data point;

wherein said report comprises:
an asymmetrical digital subscriber line (ADSL) navigation control; and
wherein selection of said asymmetrical digital subscriber line (ADSL) navigation control triggers display of an ADSL HTML page comprising:
an ADSL summary display; and
an ADSL navigation control.

* * * * *

UNITED STATES PATENT AND TRADEMARK OFFICE
CERTIFICATE OF CORRECTION

PATENT NO.    : 6,721,750 B1
DATED         : April 13, 2004
INVENTOR(S)   : Jones et al.

It is certified that error appears in the above-identified patent and that said Letters Patent is hereby corrected as shown below:

Column 3,
Line 51, delete "he" and insert -- the --.

Signed and Sealed this

Third Day of August, 2004

JON W. DUDAS
*Acting Director of the United States Patent and Trademark Office*